United States Patent
Nissen et al.

(10) Patent No.: US 10,538,317 B2
(45) Date of Patent: Jan. 21, 2020

(54) ROTOR BLADE EROSION PROTECTION SYSTEMS

(71) Applicant: Textron Innovations Inc., Providence, RI (US)

(72) Inventors: Jeffrey Paul Nissen, Fort Worth, TX (US); John Richard McCullough, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 338 days.

(21) Appl. No.: 15/221,090

(22) Filed: Jul. 27, 2016

(65) Prior Publication Data

US 2018/0029699 A1 Feb. 1, 2018

(51) Int. Cl.
*B64C 27/473* (2006.01)
*B64D 15/12* (2006.01)
*B64C 29/00* (2006.01)

(52) U.S. Cl.
CPC ........ *B64C 27/473* (2013.01); *B64C 29/0033* (2013.01); *B64C 2027/4733* (2013.01); *B64D 15/12* (2013.01)

(58) Field of Classification Search
CPC .............................. B64C 27/473; F01D 5/288
See application file for complete search history.

(56) References Cited

U.S. PATENT DOCUMENTS 3,744,743 A * 7/1973 Nay ........................ B64C 27/12
244/17.11
4,419,051 A * 12/1983 DeRosa ................ B64C 27/322
416/134 A
4,728,262 A 3/1988 Marshall
5,542,820 A 8/1996 Eaton et al.
7,871,716 B2 * 1/2011 Vance ...................... F23R 3/007
416/224
8,556,589 B2 * 10/2013 Davis .................... B64C 27/473
416/224

(Continued)

FOREIGN PATENT DOCUMENTS

FR     2213871 A1    8/1974
GB     2189204 A    10/1987
WO  2001046582 A2    6/2001

OTHER PUBLICATIONS

European Search Report, Application No. 16185722.2, European Patent Office, dated Sep. 15, 2017.

(Continued)

*Primary Examiner* — Kenneth Bomberg
*Assistant Examiner* — John S Hunter, Jr.
(74) *Attorney, Agent, or Firm* — Lawrence Youst PLLC

(57) ABSTRACT

In some embodiments, a rotorcraft includes an engine, a rotor hub assembly mechanically coupled to the engine and a plurality of rotor blade assemblies rotatably mounted to the rotor hub assembly. Each of the rotor blade assemblies includes a rotor blade having a leading edge and an erosion shield system extending spanwise along the leading edge of the rotor blade. The erosion shield system includes a plurality of erosion shield segments positioned adjacent to one another forming joints therebetween wherein, the joints deform responsive to strain experienced by the rotor blade, thereby isolating the erosion shield segments from at least a portion of the strain experienced by the rotor blade.

20 Claims, 11 Drawing Sheets

(56) References Cited

U.S. PATENT DOCUMENTS

| | | | |
|---|---|---|---|
| 8,858,184 B2* | 10/2014 | Nissen | B64C 11/205 |
| | | | 416/241 B |
| 8,899,923 B2* | 12/2014 | Hancock | F03D 1/0641 |
| | | | 416/23 |
| 2010/0278654 A1 | 11/2010 | Kyriakides | |
| 2010/0329880 A1 | 12/2010 | Davis et al. | |
| 2013/0071252 A1 | 3/2013 | Nissen | |
| 2014/0271214 A1 | 9/2014 | Sutton et al. | |
| 2015/0030458 A1 | 1/2015 | Nissen | |
| 2015/0337447 A1 | 11/2015 | Gatley | |

OTHER PUBLICATIONS

European Examination Report, Application No. 16185722.2, European Patent Office, dated Oct. 10, 2017.

* cited by examiner

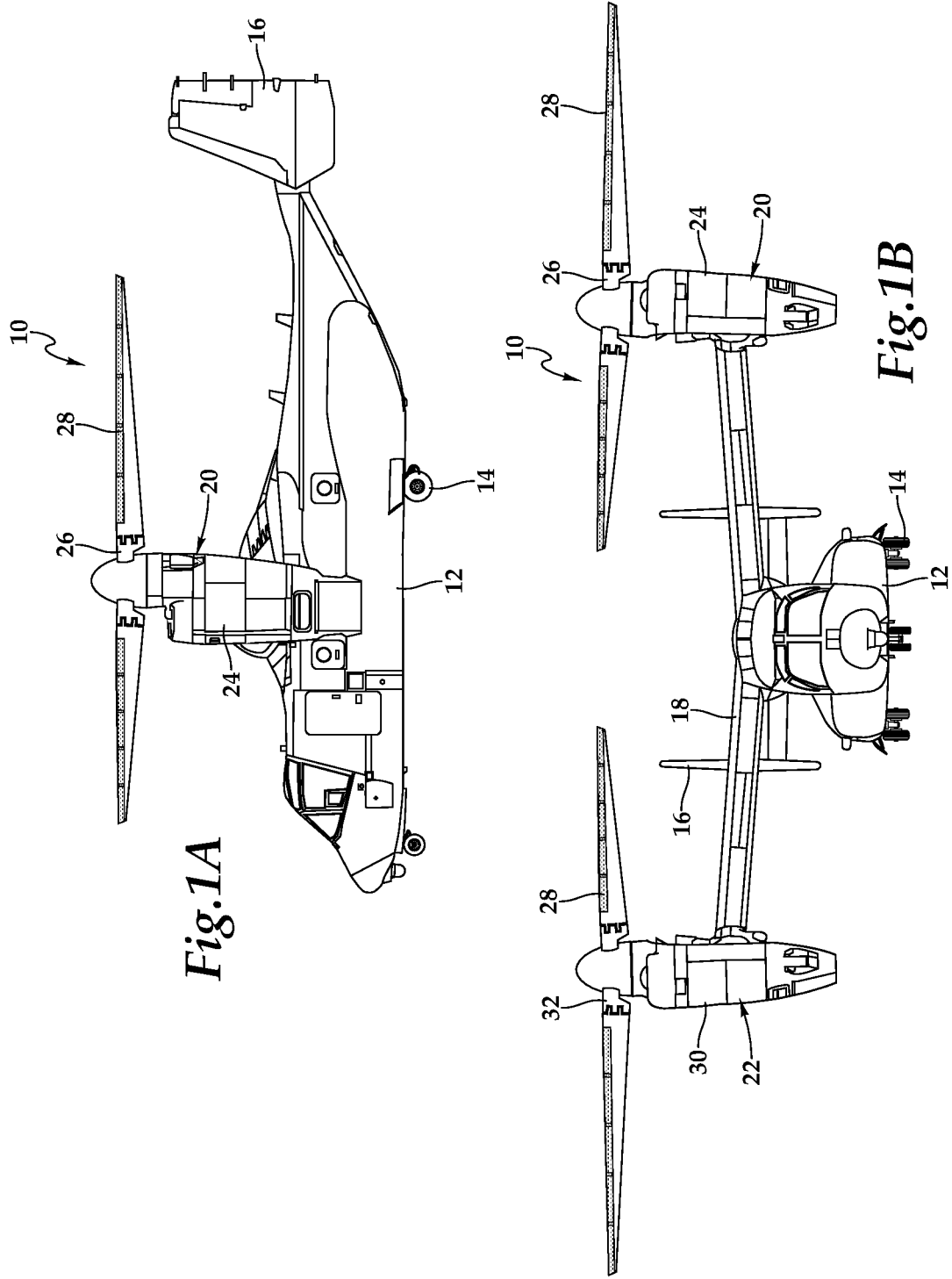

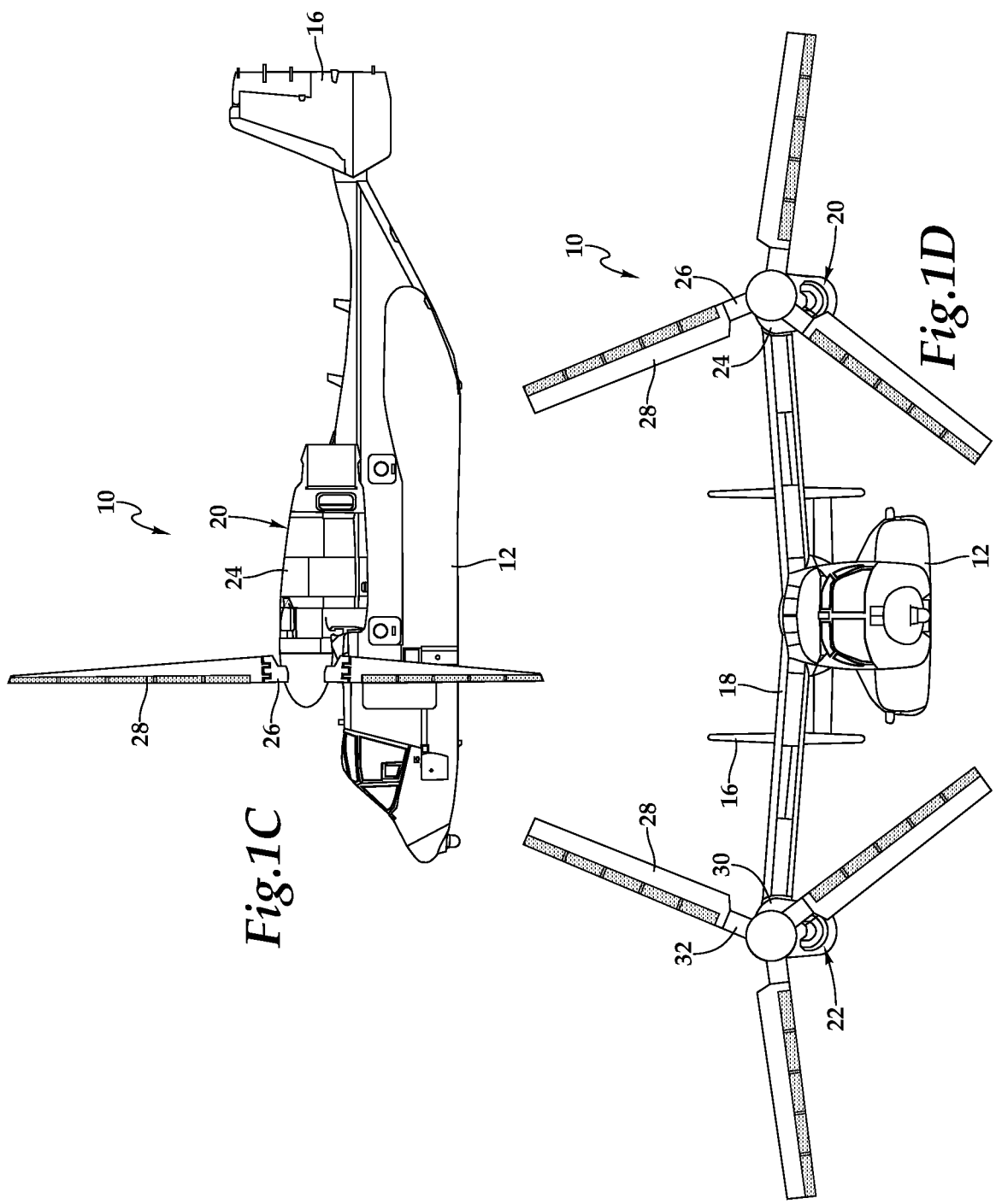

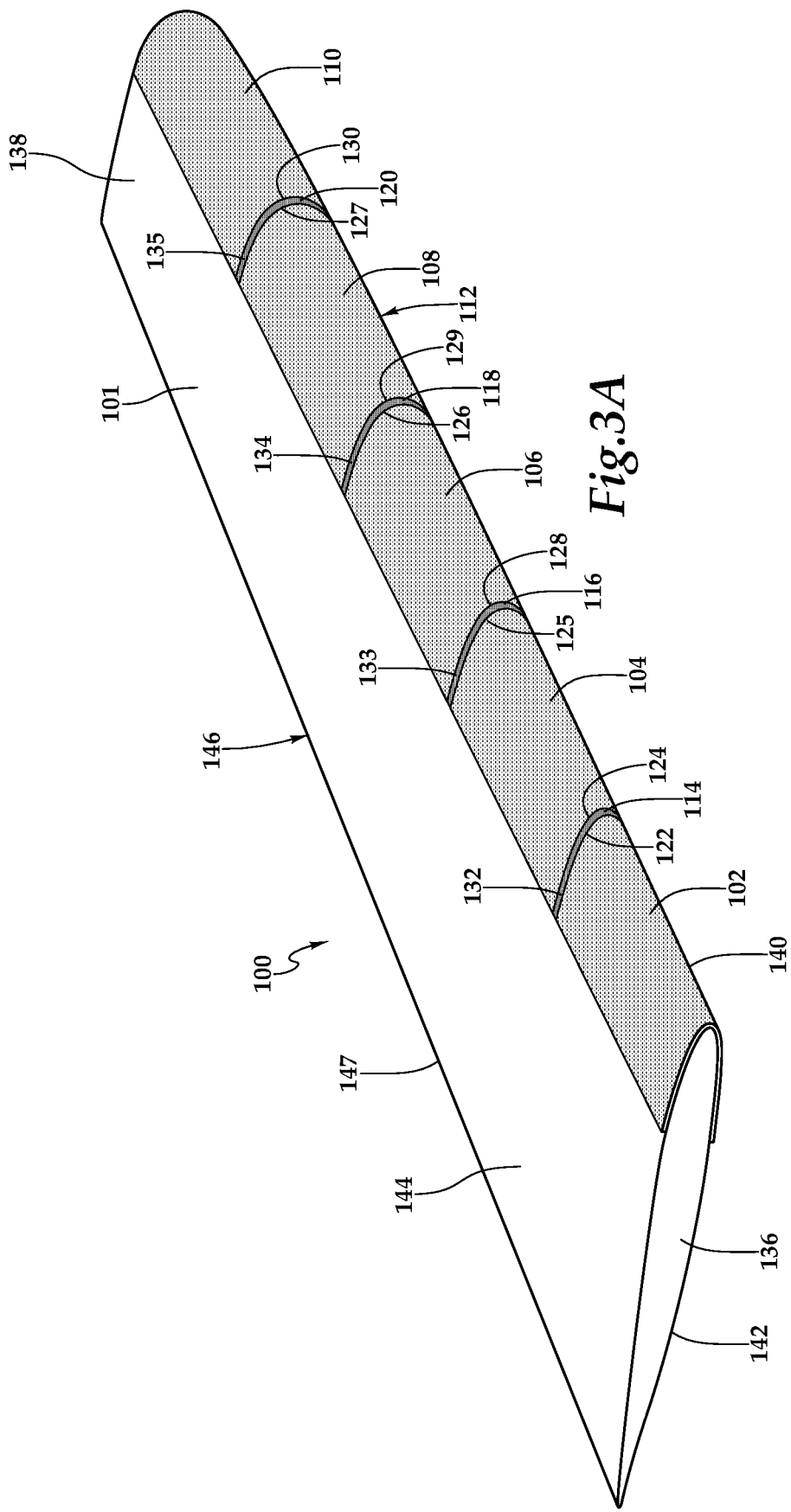

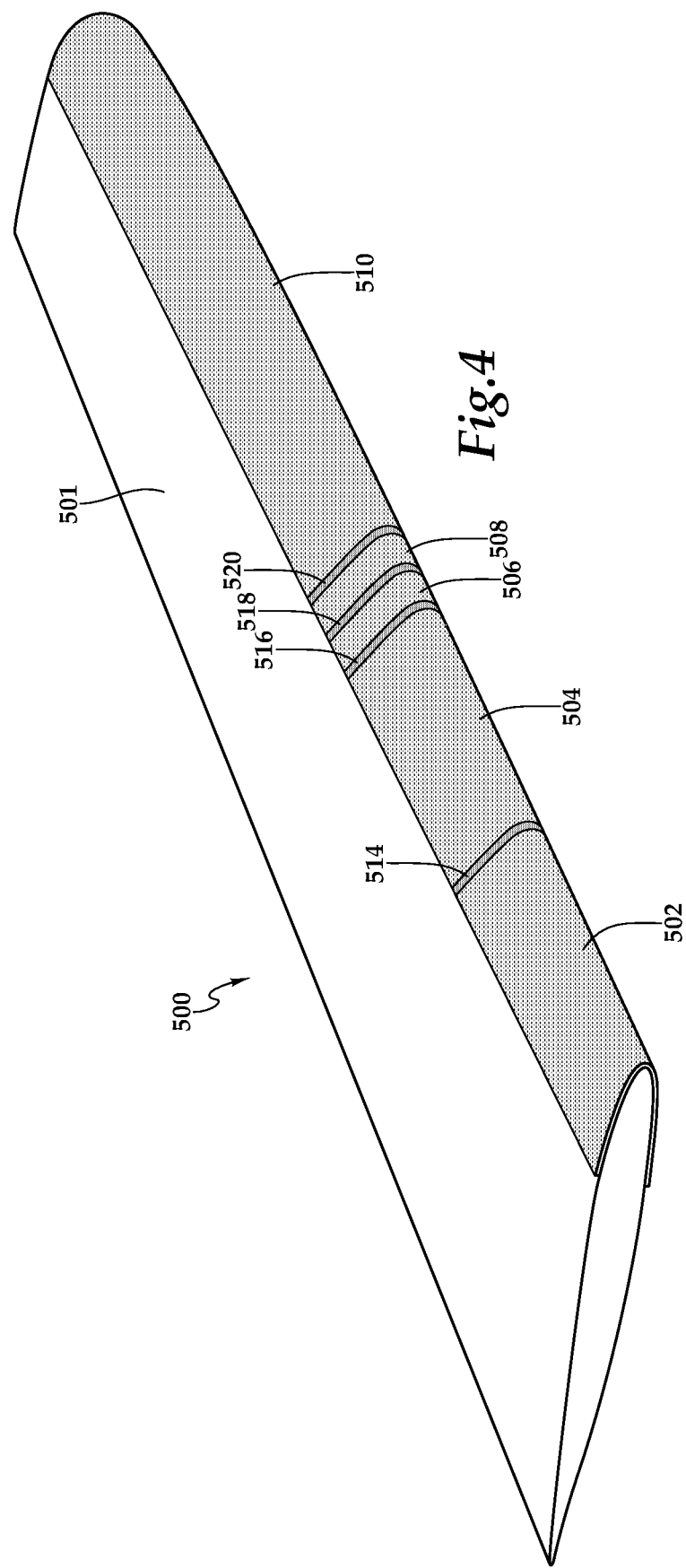

ROTOR BLADE EROSION PROTECTION SYSTEMS

TECHNICAL FIELD OF THE DISCLOSURE

The present disclosure relates, in general, to a rotor blade erosion protection system for use on the leading edge of a rotor blade and, in particular, to a rotor blade having an erosion shield system coupled thereto that is capable of withstanding the strain experienced by the rotor blade during operational cycles.

BACKGROUND

Rotor blades used for vehicular propulsion, such as helicopter rotor blades, tiltrotor proprotor blades and airplane propeller blades, are subject to erosion during operation. For example, rotor blade erosion may occur as a result of the rotor blades traveling at a high rate of speed in extremely austere environmental conditions including through a medium containing water droplets, such as rain, and/or particulates, such as dust, sand, dirt and rocks. To counter rotor blade erosion, spanwise continuous abrasion strips have been bonded to the leading edge of rotor blades to provide a shield against rotor blade erosion damage due to solid and/or liquid particle impacts. These abrasion strips are typically formed from rigid materials such as metals including stainless steels, nickel and titanium as well as polymeric materials such as rubbers, elastomers, urethanes and polyurethanes.

It has been found, however, that conventional abrasion strips are susceptible to fatigue damage, including fatigue cracking, responsive to strain experienced by rotor blades during high cycle fatigue and Ground-Air-Ground (GAG) cycles, including both tensile stain and bending stain. For example, operation cycles, rotor blades experience centrifugal forces, in-plane chord bending as well as other cyclic and noncyclic deformations. Once an abrasion strip begins to experience fatigue damage, it becomes more susceptible to erosion damage as well as to additional fatigue damage including partial or total detachment of the abrasion strip from the rotor blade. Accordingly, a need has arisen for improved rotor blade erosion protection systems that are capable of withstanding strain experienced by rotor blades, while maintaining their structural integrity and rotor blade erosion protection functionality.

SUMMARY

In a first aspect, the present disclosure is directed to a rotor blade assembly including a rotor blade having a leading edge and an erosion shield system extending spanwise along the leading edge of the rotor blade. The erosion shield system includes a plurality of erosion shield segments positioned adjacent to one another forming joints therebetween wherein, the joints deform responsive to strain experienced by the rotor blade, thereby isolating the erosion shield segments from at least a portion of the strain experienced by the rotor blade.

In some embodiments, a strain tolerant material may be disposed within the joints. In certain embodiments, the joints may be discontinuities within the erosion shield system. In some embodiments, the joints may be sized to have a maximum allowable joint width based upon a predetermined erosion particle size, such as a predetermined solid particle size or a predetermined liquid particle size. In certain embodiments, the joints may have profiles including stepped profiles, straight profiles, angled profiles and S-profiles. In some embodiments, adjacent erosion shield segments may contact one another when the rotor blade assembly is at rest. In certain embodiments, an adhesive layer may be disposed between at least one of the erosion shield segments and the rotor blade. In some embodiments, the erosion shield segments may be symmetrically disposed on the leading edge of the rotor blade about a mid span chord. In other embodiments, the erosion shield segments may be asymmetrically disposed on the leading edge of the rotor blade about the mid span chord.

In certain embodiments, at least some of the joints may be concentrated at a high strain region of the rotor blade. In some embodiments, the erosion shield system may have erosion shield segments formed from the same material. In other embodiments, the erosion shield system may have erosion shield segments formed from different materials. In certain embodiments, the erosion shield system may include at least one strain tolerant layer disposed between at least one of the erosion shield segments and the rotor blade wherein, the strain tolerant layer isolates the erosion shield segments from at least a portion of the strain experienced by the rotor blade.

In a second aspect, the present disclosure is directed to a rotorcraft including an engine, a rotor hub assembly mechanically coupled to the engine and a plurality of rotor blade assemblies mounted to the rotor hub assembly. Each of the rotor blade assemblies includes a rotor blade having a leading edge and an erosion shield system extending spanwise along the leading edge of the rotor blade. The erosion shield system includes a plurality of erosion shield segments positioned adjacent to one another forming joints therebetween wherein, the joints deform responsive to strain experienced by the rotor blade, thereby isolating the erosion shield segments from at least a portion of the strain experienced by the rotor blade.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1D are schematic illustrations of an exemplary tiltrotor aircraft in accordance with embodiments of the present disclosure;

FIGS. 3A-3F are various views of a rotor blade having an erosion shield system coupled thereto in accordance with embodiments of the present disclosure;

FIG. 4 is an isometric view of a rotor blade having an erosion shield system coupled thereto in accordance with embodiments of the present disclosure;

DETAILED DESCRIPTION

Figure 2A:
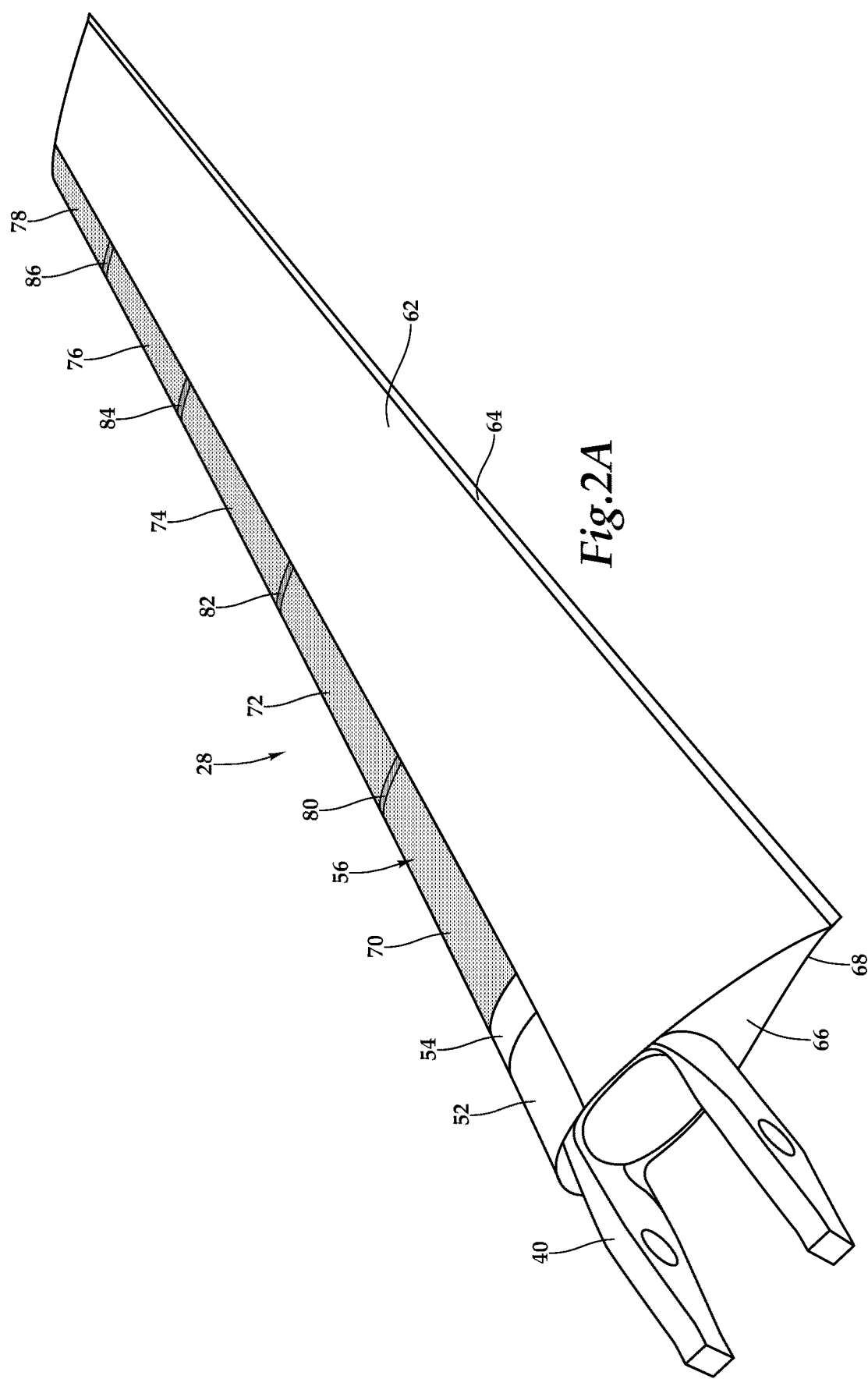
FIGS. 2A-2B are isometric and exploded views of a rotor blade assembly in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. Also, unless otherwise indicated, as used herein, "or" does not require mutual exclusivity. As used herein, the term "coupled" may include direct or indirect coupling by means including, but not limited, applying a coating, chemical bonding, mechanical connections, thermal processes, magnetic connections, adhesive layers, electrical coupling or the like. Similarly, the term "disposed on" does not imply or necessitate direct touching.

Referring to FIGS. 1A-1D in the drawings, a tiltrotor aircraft 10 is schematically illustrated. Tiltrotor aircraft 10 includes a fuselage 12, a landing gear 14, a tail member 16, a wing member 18 and rotor assemblies 20, 22. Rotor assembly 20 includes a nacelle 24 that houses an engine and transmission that provide torque and rotational energy to a drive shaft that rotates a rotor hub assembly 26 and a plurality of rotor blade assemblies 28. Likewise, rotor assembly 22 includes a nacelle 30 that houses an engine and transmission that provide torque and rotational energy to a drive shaft that rotates a rotor hub assembly 32 and a plurality of rotor blade assemblies 28. The position of rotor assemblies 20, 22, as well as the pitch of rotor blade assemblies 28, is determined using a flight control system to selectively control the direction, thrust and lift of tiltrotor aircraft 10.

FIGS. 1A-1B illustrate tiltrotor aircraft 10 in helicopter mode, in which rotor assemblies 20, 22 are positioned substantially vertical to provide a lifting thrust, such that tiltrotor aircraft 10 flies much like a conventional helicopter. FIGS. 1C-1D illustrate tiltrotor aircraft 10 in airplane mode, in which rotor assemblies 20, 22 are positioned substantially horizontal to provide a forward thrust in which a lifting force is supplied by wing member 18, such that tiltrotor aircraft 10 flies much like a conventional propeller driven aircraft. It should be appreciated that tiltrotor aircraft 10 can be operated such that rotor assemblies 20, 22 are selectively positioned between airplane mode and helicopter mode, which can be referred to as a conversion mode.

Tiltrotor aircraft 10 is illustrated as an exemplary aircraft that may employ the rotor blade erosion protection system of the present disclosure. It should be appreciated that any type of aircraft may use the illustrative embodiments to protect, for example, main rotor blades, tail rotor blades, propellers or any other rotary airfoil member susceptible to erosion. Non-limiting examples of aircraft types that may use the illustrative embodiments include airplanes, helicopters, gyrocopters, hybrid aircrafts, tiltrotor aircrafts and unmanned aircrafts. Further, wind turbine blades, turbine engine blades, high velocity fan blades and other similar blade members may also employ the system of the present embodiments to protect against erosion and strain. In yet another example, the rotor blade erosion protection systems described herein may be used on water-based vehicles, such as vehicles that utilize spinning rotor blades for propulsion in water.

Figure 2B:
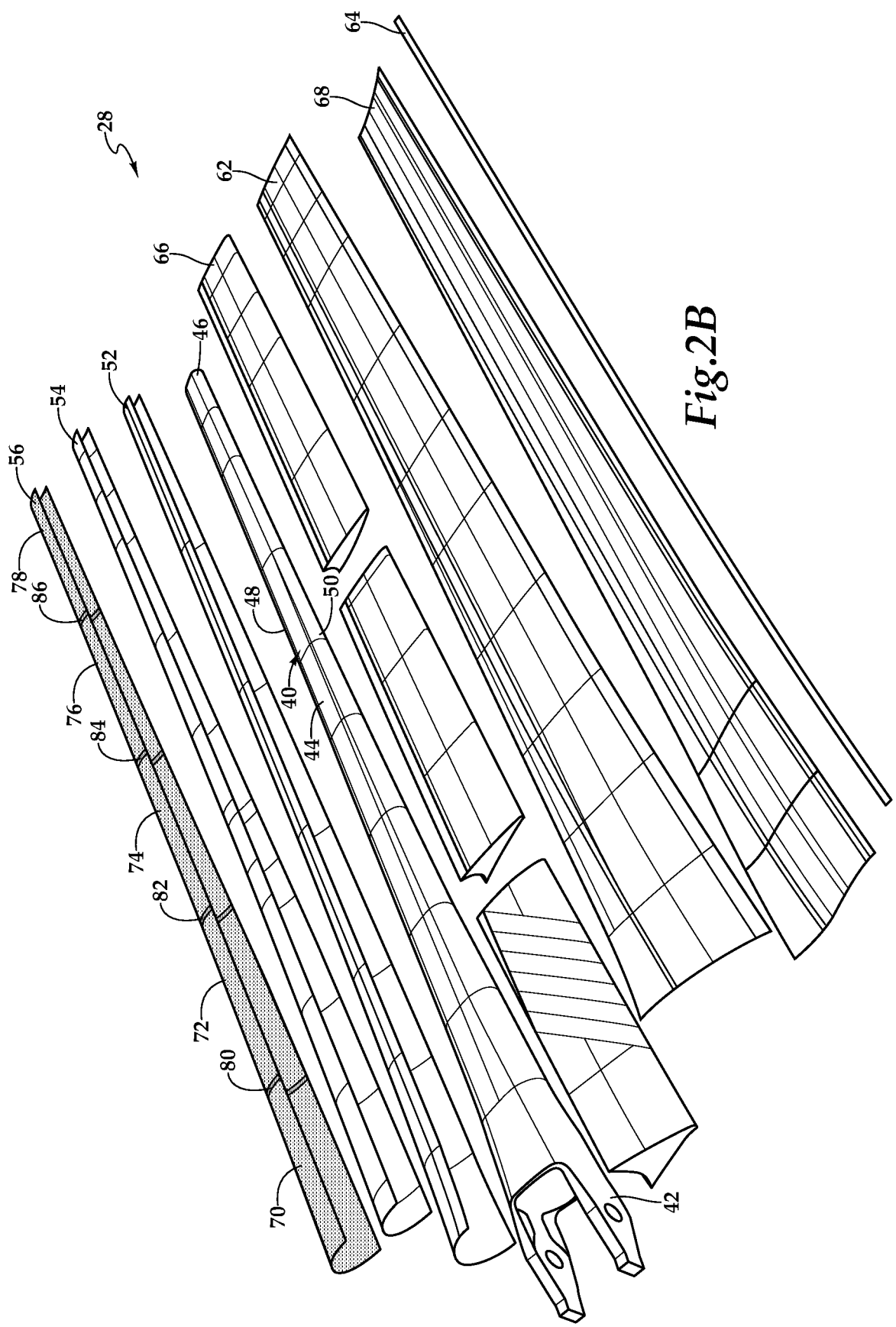

Referring to FIGS. 2A-2B in the drawings, a rotor blade assembly 28 is illustrated. Rotor blade assembly 28 includes a spar 40 that is the main structural member of rotor blade assembly 28 designed to carry the primary centrifugal and bending loads of rotor blade assembly 28. Spar 40 has a root section 42, a main section 44, a tip section 46, a leading edge 48 and a trailing edge 50. Spar 40 may be metallic or may be formed by curing together a plurality of material layers such as fiberglass fabric, carbon fabric, fiberglass tape, carbon tape and combinations thereof or from other high strength, lightweight materials. In the illustrated embodiment, rotor blade assembly 28 includes a sheath 52 and a heater blanket 54 that form the leading edge of rotor blade assembly 28. As illustrated, sheath 52 has a generally C-shaped cross section and is securably attached spanwise to spar 40 using adhesive, curing or other suitable coupling technique. Sheath 52 is preferably a monolithic structure formed from metal or by curing together a plurality of material layers such as fiberglass fabric, carbon fabric, fiberglass tape, carbon tape and combinations thereof or from other high strength, lightweight materials. Sheath 52 serves as a structural member of rotor blade assembly 28 including providing shear stiffness to rotor blade assembly 28. Heater blanket 54 is disposed spanwise on the leading edge of sheath 52 and is securably attached thereto using adhesive or other suitable coupling technique. Heater blanket 54 is part of the de-icing system of tiltrotor aircraft 10 used to melt any ice that forms on rotor blade assemblies 28.

Upper skin 62, wedge member 64, core 66 and lower skin 68 form the afterbody of rotor blade assembly 28. Upper skin 62 and lower skin 68 are preferably monolithic structures formed from metal or by curing together a plurality of material layers such as fiberglass fabric, carbon fabric, fiberglass tape, carbon tape and combinations thereof or from other high strength, lightweight materials. Upper skin 62 and lower skin 68 serve as structural members of rotor blade assembly 28 and are securably attached spanwise to spar 40 using adhesive, curing or other suitable coupling technique. Core 66 may be in the form of a nomex honeycomb structure disposed spanwise along trailing edge 50 of spar 40. Core 66 provides stability, compression resistance and shear transfer between upper skin 62 and lower skin 68. Wedge member 64 forms the trailing edge of rotor blade assembly 28. Wedge member 64 is preferably a monolithic structure formed from metal or by curing together a plurality of material layers such as fiberglass fabric, carbon fabric, fiberglass tape, carbon tape and combinations thereof or from other high strength, lightweight materials. Wedge member 64 serves as a structural member of rotor blade assembly 28 including providing stiffness to rotor blade assembly 28. Disposed spanwise on the leading edge of rotor blade assembly 28 is an erosion shield system 56 including a plurality of erosion shield segments 70, 72, 74, 76, 78 having joints 80, 82, 84, 86 with a strain tolerant material disposed therein located between erosion shield segments 70, 72, 74, 76, 78. Erosion shield system 56 is designed to protect the other components of rotor blade assembly 28 from erosion and impacts as discussed herein.

As illustrated, each of the erosion shield segments 70, 72, 74, 76, 78 has substantially the same spanwise length, however, those skilled in the art will recognize that an erosion shield system of the present disclosure could alternatively have erosion shield segments having different spanwise lengths. Also, as illustrated, each of the joints 80, 82, 84, 86 has substantially the same spanwise width, however, those skilled in the art will recognize that an erosion shield system of the present disclosure could alternatively have joints having different spanwise widths. Further, as illustrated, each of the erosion shield segments 70, 72, 74, 76, 78 has a chordwise length that tapers in the spanwise direction wherein each erosion shield segments 70, 72, 74, 76, 78, has a different chordwise length profile, however, those skilled in the art will recognize that erosion shield segments 70, 72, 74, 76, 78 could alternatively have a uniform chordwise length with the chordwise length profile of each erosion shield segment 70, 72, 74, 76, 78 being the same or different.

Even though rotor blade assembly 28 has been depicted and described as having a particular array of components in a particular configuration, it should be understood by those skilled in the art that a rotor blade assembly of the present disclosure may have fewer components, more components and/or different components. For example, rotor blade assembly 28 may be formed as a single body with rotor erosion shield system 56 coupled thereto. As used herein, the term "rotor blade" may refer collectively to some or all of the components of a rotor blade assembly with the exception of the erosion shield system of the present disclosure. In the present example, the rotor blade may consist of spar 40, sheath 52, heater blanket 54, upper skin 62, wedge member 64, core 66 and lower skin 68.

Figure 3B:
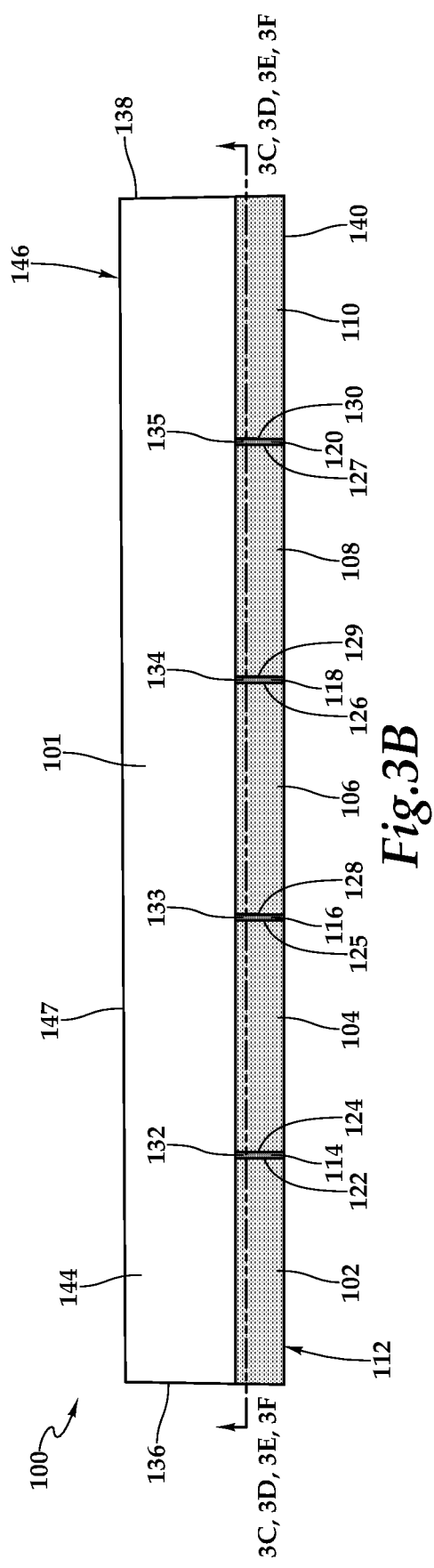
Figure 3C:
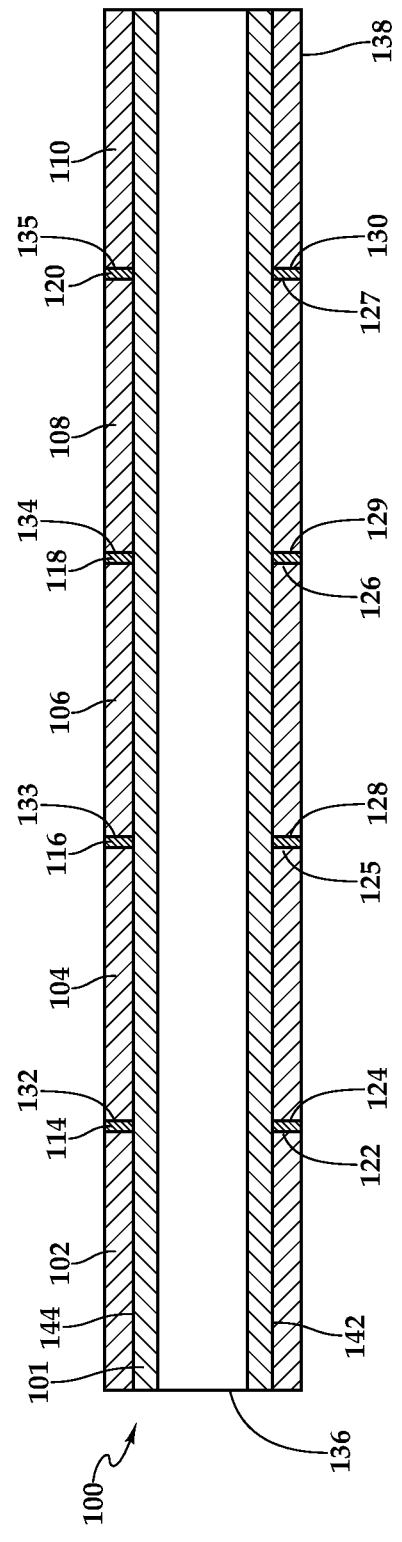

Referring to FIGS. 3A-3C, a rotor blade assembly having a rotor blade erosion protection system is schematically illustrated and generally designated 100. In the illustrated embodiment, rotor blade assembly 100 includes a rotor blade 101 having an erosion shield system including a plurality of erosion shield segments 102, 104, 106, 108, 110 coupled thereto that are generally symmetrically disposed on rotor blade 101 about a mid span chord. Erosion shield segments 102, 104, 106, 108, 110 protect rotor blade 101 from erosion that may occur during the operation of rotor blade assembly 100 such as erosion due to erosion particle impacts including water droplets, such as rain, and particulates, such as dust, sand, dirt and rocks. Erosion shield segments 102, 104, 106, 108, 110 are coupled to a leading portion 112 of rotor blade 101 such that erosion shield segments 102, 104, 106, 108, 110 that are adjacent one another form joints 114, 116, 118, 120. Leading portion 112 may be any portion of rotor blade 101 that leads rotor blade 101 while in motion or that experiences erosion by virtue of its position on rotor blade 101. Erosion shield segments 102, 104, 106, 108, 110 may be formed from any suitable material such as metals including stainless steels, nickel, titanium, cobalt and tungsten carbide as well as polymeric materials such as rubbers, elastomers, urethanes and polyurethanes or other materials including ceramics, cermets and graphene. The particular material or materials of each erosion shield segment 102, 104, 106, 108, 110 is determined based upon the erosion and strain fields in the expected use of rotor blade 101 as discussed herein, noting that an erosion shield system may include erosion shield segments all formed from the same material or erosion shield segments formed from different materials.

Joints 114, 116, 118, 120 provide structural breaks or gaps between erosion shield segments 102, 104, 106, 108, 110, thereby creating a discontinuities in the erosion shield system that accommodate or enable movement of erosion shield segments 102, 104, 106, 108, 110 relative to one another as joints 114, 116, 118, 120 deform and contract during strain cycles. As a result, joints 114, 116, 118, 120 prevent at least a portion of the strain experienced by rotor blade 101 from being transferred to erosion shield segments 102, 104, 106, 108, 110, thereby isolating or decoupling erosion shield segments 102, 104, 106, 108, 110 from at least a portion of the rotor blade strain field. Strain is thus reduced on erosion shield segments 102, 104, 106, 108, 110 during operation when rotor blade 101 experiences strain due to centrifugal forces, in-plane chord bending and the like, thereby reducing or preventing fatigue cracking and other types of damage to erosion shield segments 102, 104, 106, 108, 110.

In the illustrated embodiment, joints 114, 116, 118, 120 are equally spaced spanwise along leading portion 112 of rotor blade 101. Joints 114, 116, 118, 120 may be formed when two or more erosion shield segments 102, 104, 106, 108, 110 are adjacent one another. In the non-limiting example of FIGS. 3A-3C, the interface between an inboard edge 122 of erosion shield segment 102 and an outboard edge 124 of erosion shield segment 104 forms joint 114. Similarly, inboard edges 125, 126, 127 of erosion shield segments 104, 106, 108 are adjacent outboard edges 128, 129, 130 of erosion shield segments 106, 108, 110 to form joints 116, 118, 120, respectively.

The width of joints 114, 116, 118, 120 may vary depending on a variety of factors such as the length of the rotor blade, the material of the rotor blade, the twist of the rotor blade as well as other rotor blade specific design parameters that result in a particular rotor blade strain field during operations. In addition, the width of joints 114, 116, 118, 120 may vary depending on the size and type of erosion particles that rotor blade assembly 100 is expected to encounter during operation. For example, when rotor blade assembly 100 is at rest, joints 114, 116, 118, 120 may have a width at or approaching zero such that erosion shield segments 102, 104, 106, 108, 110 nearly, partially or fully contact or touch one another. In this example, during operation, as joints 114, 116, 118, 120 expand responsive to spanwise strain of rotor blade 101 during centrifugal loading, erosion shield segments 102, 104, 106, 108, 110 are at least partially isolated or decoupled from the rotor blade strain field and are able to move relative to one another.

Erosion shield segments 102, 104, 106, 108, 110 may alternatively have overlapping portions at joints 114, 116, 118, 120. For example, when rotor blade assembly 100 is at rest, inboard edge 122 of erosion shield segment 102 may overlap with outboard edge 124 of erosion shield segment 104 at or near joint 114. In the case of spanwise strain of rotor blade 101 during centrifugal loading, the overlap of adjacent erosion shield segments will be reduced but may still provide complete erosion protection at joints 114, 116, 118, 120 even with joints 114, 116, 118, 120 in a fully expanded state.

The width of joints 114, 116, 118, 120 may be determined in whole or in part based upon the expected erosion particle size spectrum. For example, one goal in sizing the joints may be to prevent impacts from erosion particle having a particle mass and/or kinetic energy above a predetermined threshold that could damage the more compliant joint material. In this case, a maximum allowable joint width may be determined based upon joint width expansion at the maximum strain conditions expected or allowed for rotor blade 101 and the known or expected erosion particle sizes. For example, if the erosion particles are sand, the average or typical sand particle diameter may be used to determine the maximum allowable joint width so as to prevent sand particles of a particular size from entering joints 114, 116, 118, 120. Alternatively, the maximum allowable joint width may be determined based upon known or expected rain droplet diameters. For example, rain droplet diameter data may be acquired for the particular region in which rotor blade assembly 100 is expected to operate. In this case, if rain droplet diameter data indicates that the average rain droplets size is (x), the maximum allowable joint width may be sized as a percentage of (x) such as 20%, 25%, 40%, 50%, 75% or other desired percentage of (x). Alternatively, the maximum allowable joint width may be sized based upon another desired rain droplet diameter value such as median rain droplet diameter or a rain droplet diameter value based upon a selected population of a rain droplet diameter distribution. By sizing joints 114, 116, 118, 120 in this way, damage within joints 114, 116, 118, 120 caused by liquid or solid erosion particles, may be reduced or prevented, thereby extending the life of the erosion shield system of the present disclosure to provide erosion protection to rotor blade 101.

In other embodiments, joints 114, 116, 118, 120 may have larger gaps on the order of millimeters depending on the suitability for the particular application. One or more of joints 114, 116, 118, 120 may include a labyrinth seal (not shown) to prevent particles or fluids from passing into joints 114, 116, 118, 120. In addition, joints 114, 116, 118, 120 may have uniform or non-uniform widths. For example, a joint that is located in an area of rotor blade 101 in which erosion is less than average may have a larger width than a joint in an area of rotor blade 101 that experiences high erosion. Varying joint sizes in this way allows for different levels of exposure of rotor blade 101 based on known erosion and/or strain patterns of rotor blade 101.

As best seen in FIG. 3A, joints 114, 116, 118, 120 include strain tolerant material 132, 133, 134, 135 disposed therein. Strain tolerant material 132, 133, 134, 135 is more pliant, or elastic, than the material from which erosion shield segments 102, 104, 106, 108, 110 are made. Strain tolerant material 132, 133, 134, 135 may be any material capable of tolerating strain experienced by rotor blade 101. For example, strain tolerant material 132, 133, 134, 135 may be adhesive, polyurethane, rubber, other similarly pliant materials or any combination thereof. Strain tolerant material 132, 133, 134, 135 may also be any material with a Young's modulus of less than about 50 gigapascals (GPa). The pliant nature of strain tolerant material 132, 133, 134, 135 allows movement between erosion shield segments 102, 104, 106, 108, 110 during strain cycles, which in turn, reduces strain forces on erosion shield segments 102, 104, 106, 108, 110. In addition, the inclusion of strain tolerant material 132, 133, 134, 135 in joints 114, 116, 118, 120 provides erosion protection for the areas of rotor blade 101 at joints 114, 116, 118, 120.

While a single strain tolerant material 132, 133, 134, 135 may be used in each of joints 114, 116, 118, 120, in some embodiments one or more joints 114, 116, 118, 120 may have a different strain tolerant material. For example, strain tolerant material 132 in joint 114, which is located near a tip 136 of rotor blade assembly 100, may be less elastic than strain tolerant material 135 in joint 120, which is located near a root end 138 of rotor blade assembly 100. The type of strain tolerant material placed at each joint 114, 116, 118, 120 may be determined based on the expected strain and erosion at different portions of rotor blade 101.

Erosion shield segments 102, 104, 106, 108, 110 are oriented sequentially in the spanwise direction along a leading edge 140 of rotor blade 101 with portions of erosion shield segment 102, 104, 106, 108, 110 extending in the chordwise direction to partially cover an underside 142 of rotor blade 101 and an upper side 144 of rotor blade 101. While erosion shield segments 102, 104, 106, 108, 110 are shown to be coupled to leading edge 140 of rotor blade 101, in other embodiments erosion shield segments 102, 104, 106, 108, 110, including joints 114, 116, 118, 120, may be located anywhere on rotor blade 101, including a trailing portion 146 or a trailing edge 147 of rotor blade 101.

In the illustrated embodiment, each of erosion shield segments 102, 104, 106, 108, 110 has substantially the same spanwise length. In other embodiments, however, the length of erosion shield segments 102, 104, 106, 108, 110 may be non-uniform so as to accommodate different strains on different portions of rotor blade 101. Also, while five erosion shield segments 102, 104, 106, 108, 110 are shown in FIGS. 3A-3B, the rotor blade erosion protection system of the present disclosure may include any suitable number of erosion shield segments (e.g., 2, 10, 25, 40, etc . . . ) depending on the application. In addition, even though erosion shield segments 102, 104, 106, 108, 110 are shown to cover substantially all of leading edge 140 of rotor blade 101, it should be understood by those skilled in the art that in other embodiments, erosion shield segments 102, 104, 106, 108, 110 may cover varying spanwise lengths of leading edge 140, including, inter alia, 25%, 50% 80%, 90% or 100%.

Erosion shield segments 102, 104, 106, 108, 110 may be made from any material capable of preventing or reducing erosion or damage to rotor blade assembly 100. Preferably, erosion shield segments 102, 104, 106, 108, 110 are made of material that is generally harder or less elastic than strain tolerant materials 132, 133, 134, 135. In one example, erosion shield segments 102, 104, 106, 108, 110 may have a Young's modulus of greater than or equal to about 50 GPa. The hardness of erosion shield segments 102, 104, 106, 108, 110 prevents particulates, such as sand, dirt, dust or rain, from eroding or damaging rotor blade 101.

Non-limiting examples of materials from which erosion shield segments 102, 104, 106, 108, 110 may be formed include metals including stainless steels, nickel, titanium, cobalt and tungsten carbide as well as polymeric materials such as rubbers, elastomers, urethanes and polyurethanes or other materials including ceramics, cermets and graphene or any combination thereof. In addition, erosion shield segments 102, 104, 106, 108, 110 may be coupled to rotor blade 101 in a variety of ways. For example, erosion shield segments 102, 104, 106, 108, 110 may be pre-fabricated members that are adhered to leading portion 112 of rotor blade 101 using adhesive or an adhesive layer. Erosion shield segments 102, 104, 106, 108, 110 may also be cured onto rotor blade 101. In another example, erosion shield segments 102, 104, 106, 108, 110 may be coatings that are deposited onto rotor blade 101 using any suitable deposition technique, such as high velocity oxygen fueled deposition, thin film deposition, chemical deposition and physical deposition, to name a few. It will be appreciated by one of ordinary skill in the art that erosion shield segments 102, 104, 106, 108, 110 may be coupled to rotor blade 101 in a variety of ways.

Even though the thicknesses of erosion shield segments 102, 104, 106, 108, 110 are shown to be uniform, it should be understood by those skilled in the art that erosion shield segments 102, 104, 106, 108, 110 may have varying thicknesses. For example, erosion shield segments 102, 104, 106, 108, 110 may have respective thicknesses that increase or decrease in the spanwise or chordwise direction of rotor blade assembly 100. In another example, the thickness of each erosion shield segment 102, 104, 106, 108, 110 may be customized based on the amount of erosion expected for the particular region of rotor blade 101 on which each erosion shield segment 102, 104, 106, 108, 110 is coupled.

The difference in elasticity between erosion shield segments 102, 104, 106, 108, 110 and strain tolerant material 132, 133, 134, 135 provide a discontinuity in the erosion shield system along leading portion 112 of rotor blade assembly 100 such that when rotor blade 101 experiences strain, erosion shield segments 102, 104, 106, 108, 110 are at least partially isolated or decoupled from the strain including allowing relative movement between erosion shield segments 102, 104, 106, 108, 110, thereby preventing fatigue cracking and other damage to erosion shield segments 102, 104, 106, 108, 110 and enabling continued protection of rotor blade 101. Strain tolerant material 132, 133, 134, 135 also provides a level of protection for rotor blade 101 preventing erosion particles from directly impacting rotor blade 101. In this way, erosion reduction may be achieved without compromising the structural integrity of the erosion shield segments 102, 104, 106, 108, 110 tasked with preventing such erosion. Thus, the structural integrity of rotor blade 101 may be prolonged and damage may be prevented thereto.

Figure 3D:
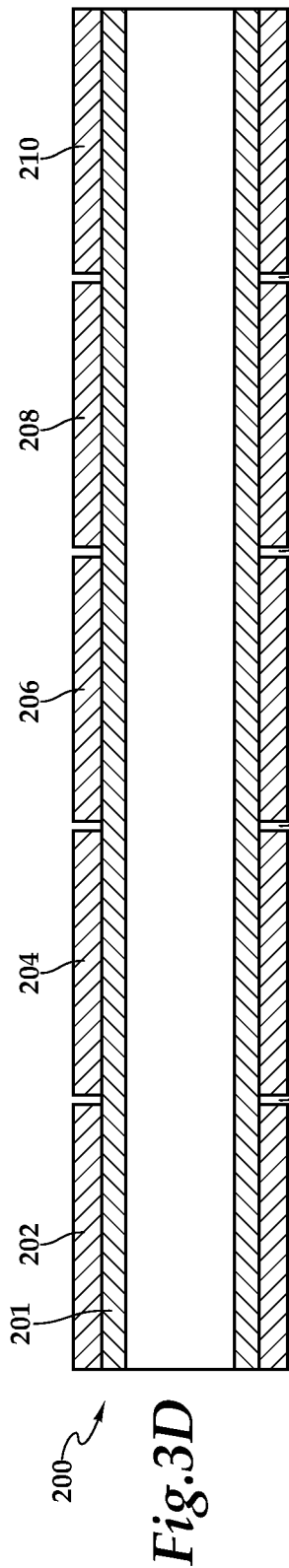

Referring to FIG. 3D, a cross-section of rotor blade assembly 100 in FIG. 3B is taken along line 3D-3D to show alternative embodiments of the present disclosure. Elements of FIG. 3D that are analogous to elements in FIGS. 3A-3C have been identified by indexing the reference numerals by 100. In FIG. 3D, rotor blade assembly 200 includes a rotor blade 201 having an erosion shield system including a plurality of erosion shield segments 202, 204, 206, 208, 210 coupled thereto having joints 214, 216, 218, 220 located therebetween. In the illustrated embodiment, joints 214, 216, 218, 220 do not include any strain tolerant material but instead only service to create discontinuities within the erosion shield system, which provides a level of strain isolation to erosion shield segments 202, 204, 206, 208, 210 during strain cycles experienced by rotor blade 201. It is noted that joints 214, 216, 218, 220 may partially expose rotor blade 201 to erosion particles at joints 214, 216, 218, 220. Preferably, joints 214, 216, 218, 220 have a suitably small joint width to minimize the risk, including, for example, having erosion shield segments 202, 204, 206, 208, 210 at least partially in contact with one another at joints 214, 216, 218, 220 when rotor blade 201 is at rest. Also, while all of joints 214, 216, 218, 220 are shown to be cavities, in other embodiments, some of joints 214, 216, 218, 220 may be cavities, while others are at least partially filled with a strain tolerant material. The inclusion of strain tolerant material in some of joints 214, 216, 218, 220 may be determined based on strain and/or erosion patterns expected for rotor blade 201.

Figure 3E:
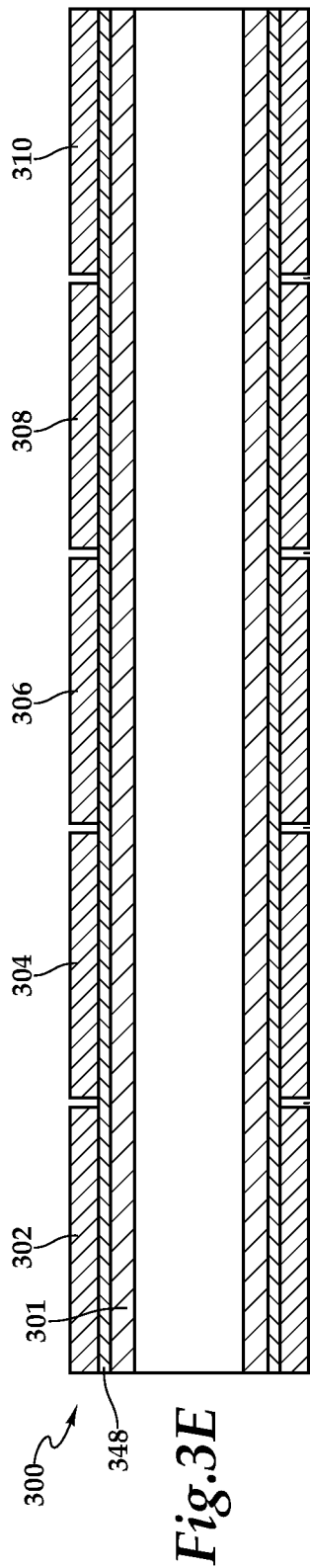

Referring to FIG. 3E, a cross-section of rotor blade assembly 100 in FIG. 3B is taken along line 3E-3E to show alternative embodiments of the present disclosure. Elements of FIG. 3E that are analogous to elements in FIGS. 3A-3C have been identified by indexing the reference numerals by 200. In FIG. 3E, rotor blade assembly 300 includes a rotor blade 301 having an erosion shield system including a plurality of erosion shield segments 302, 304, 306, 308, 310 coupled thereto having joints 314, 316, 318, 320 located therebetween that provide strain isolation functionality as discussed herein. Erosion shield segments 302, 304, 306, 308, 310 are coupled to rotor blade 301 by an adhesive layer 348. Adhesive layer 348 may be deposited, coated or otherwise disposed on rotor blade 301. Erosion shield segments 302, 304, 306, 308, 310 may then be attached, disposed, located or otherwise coupled to the exterior of adhesive layer 348. In the illustrated embodiment, adhesive layer 348 covers rotor blade 301 at joints 314, 316, 318, 320, thus, providing some protection to rotor blade 301 at joints 314, 316, 318, 320. In addition, adhesive layer 348 may be a strain tolerant material that provides elasticity between erosion shield segments 302, 304, 306, 308, 310 and rotor blade 301, thereby reducing strain transfer from rotor blade 301 to erosion shield segments 302, 304, 306, 308, 310.

Figure 3F:
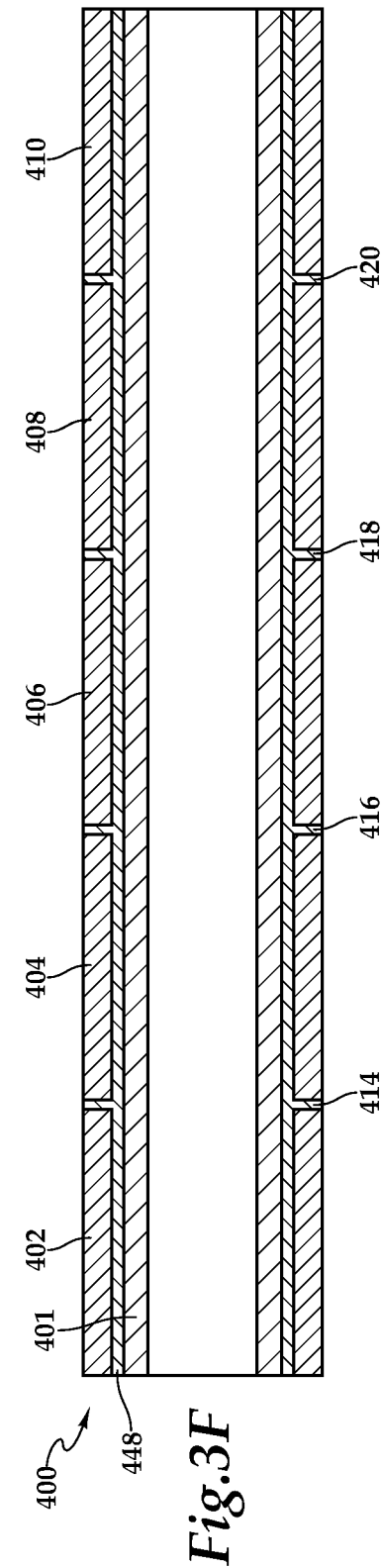

Referring to FIG. 3F, a cross-section of rotor blade assembly 100 in FIG. 3B is taken along line 3F-3F to show alternative embodiments of the present disclosure. Elements of FIG. 3F that are analogous to elements in FIGS. 3A-3C have been identified by indexing the reference numerals by 300. In FIG. 3F, rotor blade assembly 400 includes a rotor blade 401 having an erosion shield system including a plurality of erosion shield segments 402, 404, 406, 408, 410 coupled thereto having joints 414, 416, 418, 420 located therebetween that provide strain isolation functionality as discussed herein. Erosion shield segments 402, 404, 406, 408, 410 are coupled to rotor blade 401 by an adhesive layer 448. Adhesive layer 448, which may be a strain tolerant material, also fills the cavities between adjacent erosion shield segments 402, 404, 406, 408, 410. Thus, joints 414, 416, 418, 420 are substantially filled with strain tolerant material, thereby providing additional erosion protection for rotor blade 401 at the joint locations. In addition, adhesive layer 448 provides elasticity between erosion shield segments 402, 404, 406, 408, 410 and rotor blade 401, thereby reducing strain transfer from rotor blade 401 to erosion shield segments 402, 404, 406, 408, 410.

Referring to FIG. 4, a rotor blade assembly having a rotor blade erosion protection system is schematically illustrated and generally designated 500. Rotor blade assembly 500 includes a rotor blade 501 having an erosion shield system including a plurality of erosion shield segments 502, 504, 506, 508, 510 coupled thereto having joints 514, 516, 518, 520 with a strain tolerant material disposed therein located between erosion shield segments 502, 504, 506, 508, 510 that provide strain isolation functionality as discussed herein. Based on rotor blade analysis, joints 516, 518, 520 have been concentrated in an area of rotor blade 501 at which higher strain is expected. For example, the strain on rotor blade 501 may be predetermined using strain profile test data for rotor blade 501 or data obtained from fielded aircraft. Various factors may be used to determine the strain profile for a particular type of rotor blade, including measured strain during operation, if available, as well as rotor blade property data including the length and shape of the rotor blade, the slope or twist characteristics of the rotor blade and the material or materials used to form the rotor blade. Other non-limiting factors that may influence the strain field of a rotor blade are rotor speed, operational environment, altitude, pitch and/or duration of operation.

In the illustrated embodiment, erosion shield segments 502, 504, 506, 508, 510 have non-uniform spanwise lengths and are asymmetrically disposed on rotor blade 501 about a mid span chord. By varying the size and/or the materials of erosion shield segments 502, 504, 506, 508, 510, the erosion protection offered to rotor blade 501 can be uniquely tailored. For example, in a relatively low strain and low erosion region of rotor blade 501, a relatively long erosion shield segment 510 may be formed from a polymer such as urethane or polyurethane. In relatively high strain and low erosion regions of rotor blade 501, relatively short erosion shield segments 506, 508 may be formed from an elastomer such as rubber. In a lower strain but high erosion region of rotor blade 501, an intermediate length erosion shield segment 504 may be formed from a metal such as stainless steel. In the relatively low strain but highest erosion region of rotor blade 501, an intermediate length erosion shield segment 502 may be formed from metal such as tungsten carbide or a ceramic, cermet or graphene material. It should be understood by those skilled in the art that factors other than strain tolerance and erosion resistance may be considered when selecting the length and/or material for an erosion shield segment for a particular region of a rotor blade including, for example, the repairability of the erosion shield segment.

Figure 5:
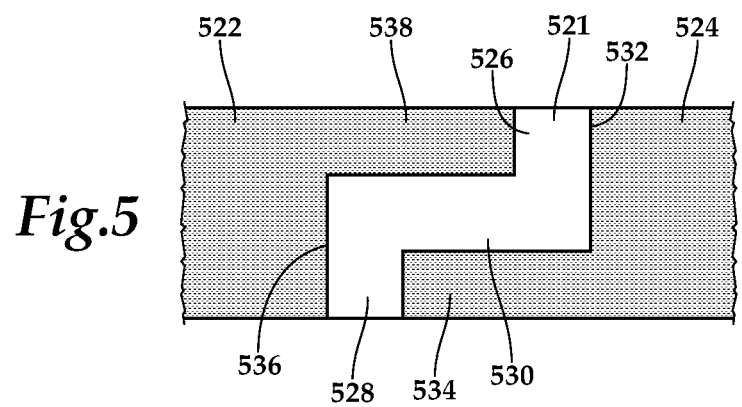
FIG. 5 is a top view of a joint of an erosion shield system in accordance with embodiments of the present disclosure.

Referring next to FIGS. 5-8, a variety of joints having different configurations will now be discussed with reference to illustrative embodiments. While not depicted in the embodiments of FIGS. 5-8, the joints of the present disclosure preferably include a strain tolerant material disposed therein. Referring particularly to FIG. 5, joint 521 between adjacent erosion shield segments 522, 524 is shown to have a stepped profile. Joint 521 has lateral portions 526, 528, which extend chordwise relative to the rotor blade. Joint 521 also has longitudinal portion 530 between lateral portions 526, 528. Longitudinal portion 530 of joint 521 extends spanwise relative to the rotor blade. Outboard portion 532 of erosion shield segment 524 has a forward protrusion 534 located toward the leading edge of the rotor blade and inboard portion 536 of erosion shield segment 522 has an aft protrusion 538. Forward and aft protrusions 534, 538 may provide enhanced erosion protection for the rotor blade. For example, particulates that may otherwise damage the material in joint 521 may be disrupted or deflected by forward protrusion 534 or aft protrusion 538.

Figure 6:
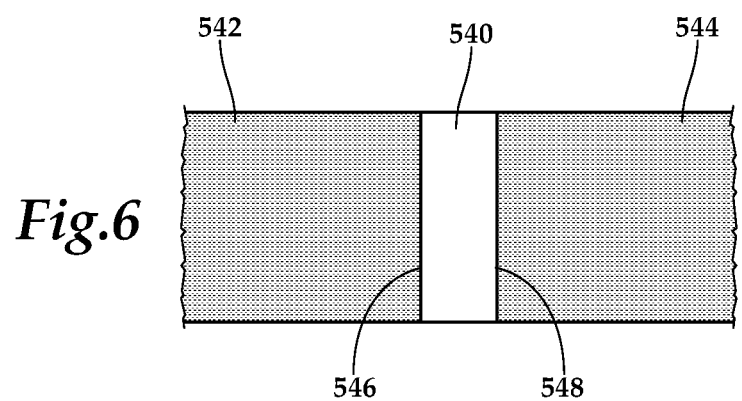
FIG. 6 is a top view of a joint of an erosion shield system in accordance with embodiments of the present disclosure.

Referring now to FIG. 6, joint 540 between adjacent erosion shield segments 542, 544 is shown to have a straight profile. The straight configuration shown in FIG. 6 is generally the same configuration of joints shown in FIGS. 3A-3F and 4 and is designed to be a fraction of the erosion particle diameter such that the kinetic energy remaining can be sufficiently absorbed by the joint material. Inboard edge 546 of erosion shield segment 542 is substantially parallel with outboard edge 548 of erosion shield segment 544. Also, inboard edge 546 and outboard edge 548 are substantially perpendicular with the leading edge of the rotor blade.

Figure 7:
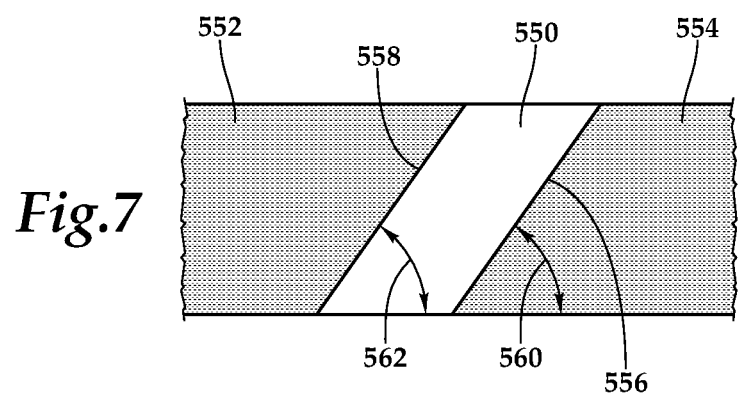
FIG. 7 is a top view of a joint of an erosion shield system in accordance with embodiments of the present disclosure.

Referring next to FIG. 7, joint 550 between adjacent erosion shield segments 552, 554 is shown to have an angled profile. In particular, outboard edge 556 of erosion shield segment 554 forms an angle 560 relative to the leading edge of the rotor blade that is less than 90 degrees. Inboard edge 558 of erosion shield segment 552 is generally parallel to outboard edge 556 of erosion shield segment 554 and forms an angle 562 relative to the leading edge that is substantially congruent with angle 560. While inboard edge 558 and outboard edge 556 are shown to be generally parallel, inboard edge 558 and outboard edge 556 may also be non-parallel. It will also be appreciated by those skilled in the art that angles 560, 562 may be varied between 0 and 180 degrees such that joint 550 can take on various angled profiles, including steep and shallow angles. For example, one or both of angles 560, 562 may be 10, 30, 45, 60, 75, 85, 85, 120 or 145 degrees. Further, the angular profile of joint 550 may offer the same or similar deflection advantages as those described above for stepped joint 520 in FIG. 5.

Figure 8:
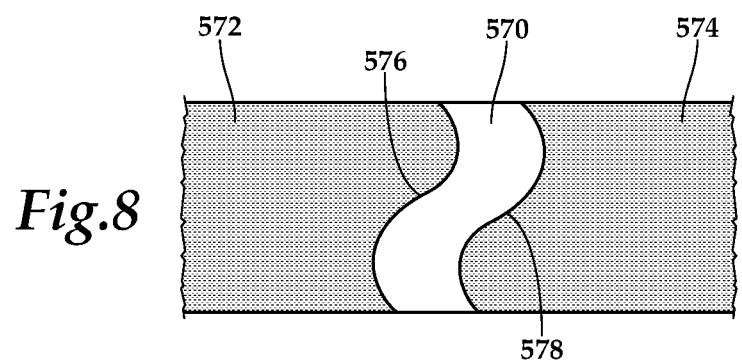
FIG. 8 is a top view of a joint of an erosion shield system in accordance with embodiments of the present disclosure.

Referring to FIG. 8, joint 570 between adjacent erosion shield segments 572, 574 is shown to resemble an S-profile. In this embodiment, joint 570 has an approximate "S" or double curved shape as defined by S-profile of inboard and outboard edges 576, 578 of erosion shield segments 572, 574, respectively. As used herein, an S-profile includes both a forward and reverse "S" shape. While inboard and outboard edges 576, 578 of erosion shield segments 572, 574 are each shown to have two curves, joint 570 may have any suitable number of curvatures, and such curvatures may be formed at any suitable arc radius.

Figure 9:
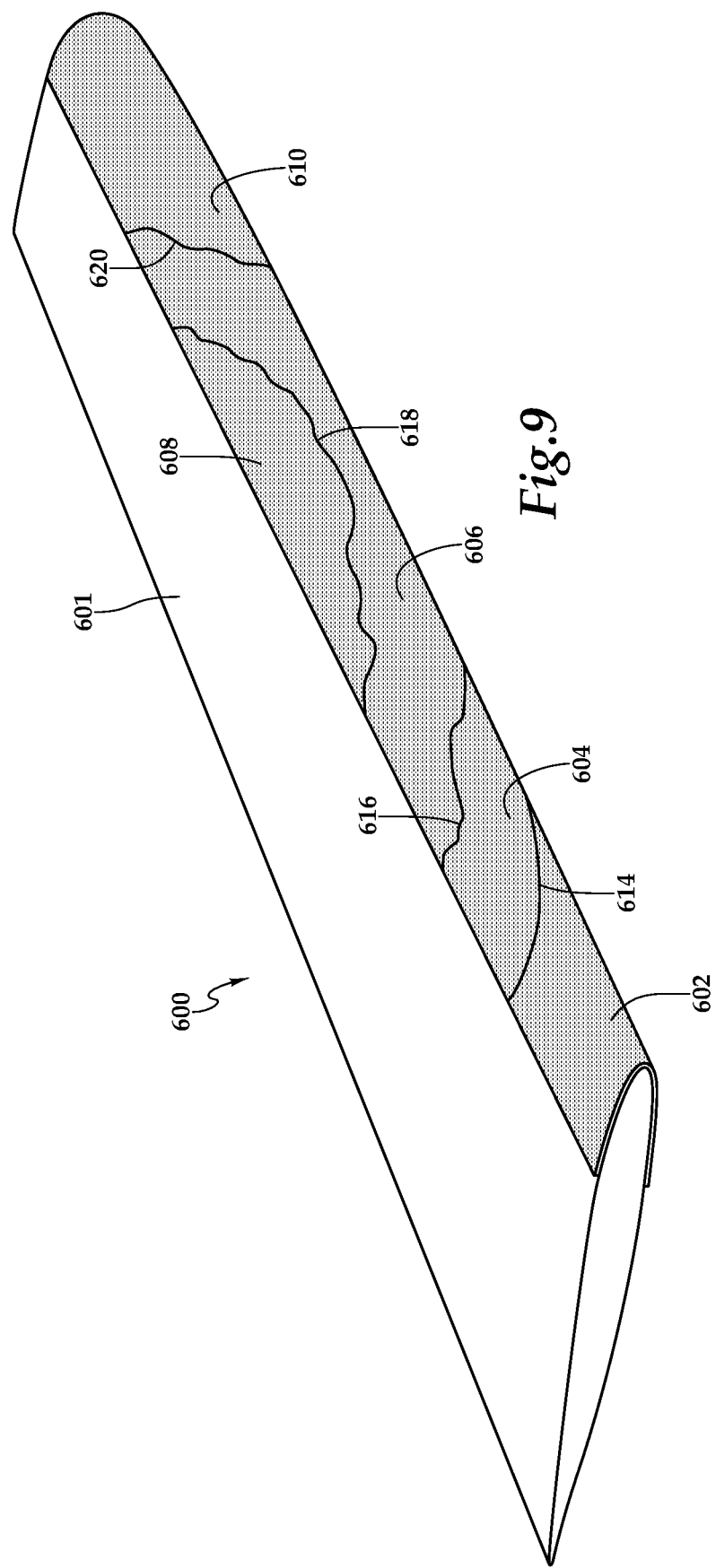
FIG. 9 is an isometric view of a rotor blade having an erosion shield system coupled thereto in accordance with embodiments of the present disclosure.
Figure 10:
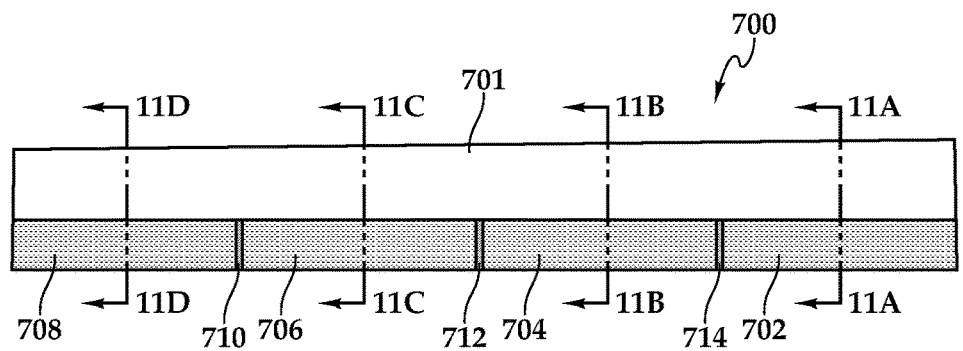
FIG. 10 is a top view of a rotor blade having an erosion shield system coupled thereto in accordance with embodiments of the present disclosure.

Referring to FIG. 9, a rotor blade assembly having a rotor blade erosion protection system is schematically illustrated and generally designated 600. Rotor blade assembly 600 includes a rotor blade 601 having an erosion shield system including a plurality of erosion shield segments 602, 604, 606, 608, 610 coupled thereto having joints 614, 616, 618, 620 with a strain tolerant material disposed therein located between erosion shield segments 602, 604, 606, 608, 610 that provide strain isolation functionality as discussed herein. Based on rotor blade strain analysis, a stain map of rotor blade 501 has been generated. As discussed herein, various factors may be used to determine the strain fields for a particular type of rotor blade, including measured strain during operation as well as rotor blade property data including the length and shape of the rotor blade, the slope or twist characteristics of the rotor blade and the material or materials used to form the rotor blade. Other non-limiting factors that may influence the strain field of a rotor blade are rotor speed, operational environment, altitude, pitch and/or duration of operation.

In the illustrated embodiment, erosion shield segments 602, 604, 606, 608, 610 generally follow the stain map developed for rotor blade 601 and provide a uniquely tailored erosion shield system. For example, in a relatively low strain and low erosion regions of rotor blade 601, erosion shield segments 606, 610 may be formed from a polymer such as urethane or polyurethane. In a high strain and low erosion region of rotor blade 601, erosion shield segment 608 may be formed from an elastomer such as rubber. In a lower strain but high erosion region of rotor blade 601, erosion shield segment 604 may be formed from a metal such as stainless steel. In the relatively low strain but highest erosion region of rotor blade 501, erosion shield segment 602 may be formed from metal such as tungsten carbide or a ceramic, cermet or graphene material. As should be apparent to those skilled in the art, the lengths, thicknesses, shapes, orientations, materials, joints and the like of the erosion shield segments used in the erosion shield system of the present disclosure may have many variations, configurations and permutations, each of which is considered to be within the scope of the present disclosure.

Figure 11A:
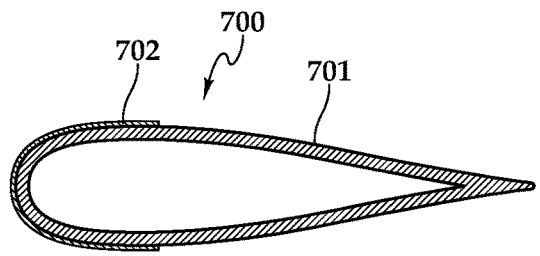
FIGS. 11A-11D are cross sectional views of a rotor blade having an erosion shield system coupled thereto in accordance with embodiments of the present disclosure.
Figure 11B:
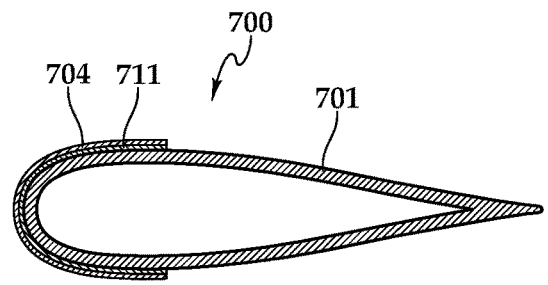

Referring to FIGS. 10 and 11A-D, a rotor blade assembly having a rotor blade erosion protection system coupled thereto is schematically illustrated and generally designated 700. Rotor blade assembly 700 includes a rotor blade 701 having an erosion shield system including a plurality of erosion shield segments 702, 704, 706, 708 coupled thereto having joints 710, 712, 714 with a strain tolerant material disposed therein located between erosion shield segments 702, 704, 706, 708 that provide strain isolation functionality as discussed herein. As best seen in FIG. 11A, erosion shield 702 is disposed directly on the leading edge of rotor blade 701 by, for example, a deposition or coating process. As best seen in FIG. 11B, a strain tolerant layer 711 is disposed on the leading edge of rotor blade 701 with erosion shield 704 disposed on strain tolerant layer 711. Strain tolerant layer 711 acts as a sub-layer positioned between erosion shield 704 and rotor blade 701 to reduce strain on erosion shield 704 by enabling relative movement between erosion shield 704 and rotor blade 701 in response to strain experienced by rotor blade 701. Providing a sub-layer of strain tolerant material under erosion shield 704 may help to protect erosion shield 704 from strain by providing a material buffer from the bends, stretching and other deformations of rotor blade 701. Strain tolerant layer 711 may also prevent at least a portion of the strain experienced by rotor blade 701 from being transferred to erosion shield 704.

It should be noted that utilizing a sub-layer of strain tolerant material may allow the erosion shield system to be structurally continuous spanwise along the entire length of a rotor blade assembly with no joints therebetween or discontinuities therein. Use of a structurally continuous erosion shield system may provide continuous erosion coverage across a rotor blade, which may be desirable in some operational circumstances.

Figure 11C:
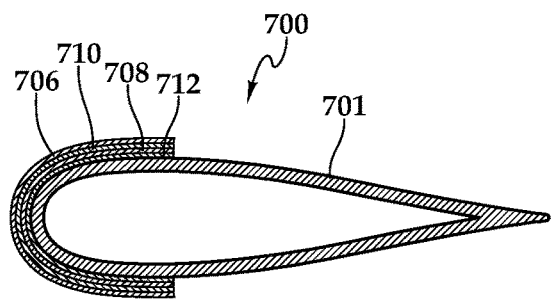

As best seen in FIG. 11C, a pair of intermediate layers 708, 710 is disposed between strain tolerant layer 712 and erosion shield 706. Intermediate layers 708, 710 have a strain tolerance that is less than strain tolerant layer 712 but greater than erosion shield 706. In this arrangement, the hardest material, which forms erosion shield segment 706, is farthest from rotor blade 701. Conversely, the most strain tolerant material, which forms strain tolerant layer 712, is closest to rotor blade 701. Preferably, the material from which intermediate layer 708 is formed is more strain tolerant than the material from which intermediate layer 710 is formed. Thus, progressively harder, or less elastic, layers are provided as one progresses away from rotor blade 701, thereby giving erosion shield 706 progressively buffered protection against the strain experienced by rotor blade 701 to reduce or prevent erosion shield 706 from being damaged. For example, the layers on rotor blade 701 may progressively increase from low to high durometer, with strain tolerant layer 712 having the lowest durometer and erosion shield 706 having the highest durometer. In one non-limiting example, strain tolerant layer 712 may be a flexible urethane, intermediate layers 708, 710 may be rubber variants and erosion shield 706 may be a metallic material. In another example, strain tolerant layer 712 may be a tungsten carbide coating with a 25% cobalt composition, intermediate layer 708 may be a tungsten carbide coating with a 20% cobalt composition, intermediate layer 710 may be a tungsten carbide coating with a 15% cobalt composition and erosion shield 706 may be a tungsten carbide coating with a 10% cobalt composition.

Figure 11D:
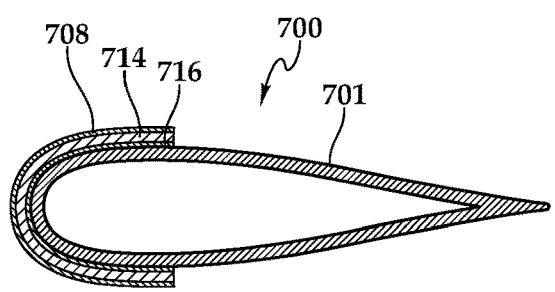

As best seen in FIG. 11D, an intermediate layer 714 is interposed between erosion shield 708 and strain tolerant layer 716 and has a greater thickness than both erosion shield 708 and strain tolerant layer 716. Indeed, the increased thickness of intermediate layer 714 illustrates, by example, that the thickness of any layer, including strain tolerant layer 716 or erosion shield 708, may be increased or decreased relative to other layers and take into account such factors as the amount of strain or erosion experienced for a particular region of rotor blade assembly 700. Additionally, any layer illustrated in FIG. 11D may taper in thickness spanwise or chordwise. For example, erosion shield 708 may taper spanwise to increasing thickness in the outboard direction of rotor blade assembly 700. Strain tolerant layer 716 may complement the tapered erosion shield 708 by decreasing thickness spanwise in the inboard direction of rotor blade assembly 700. In yet another example, one or all of strain tolerant layer 716, intermediate layer 714 or erosion shield 708 may taper to decreasing thickness chordwise, such that one or all of the layers is thickest proximate the leading edge of rotor blade assembly 700 and decreases in the chordwise direction away from the leading edge of rotor blade assembly 700.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor blade assembly comprising:
    a rotor blade having a root, a tip and a leading edge; and
    an erosion shield system extending spanwise along the leading edge of the rotor blade, the erosion shield system including a plurality of erosion shield segments positioned adjacent to one another forming cavities therebetween, the cavities contiguously filled with strain tolerant material to form one or more rows of joints such that the strain tolerant material is flush with an outer surface of the plurality of erosion shield segments;
    wherein, the erosion shield system has a chordwise length that tapers in a spanwise direction from increasing to decreasing chordwise length from the root of the rotor blade to the tip of the rotor blade such that the plurality of erosion shield segments have nonuniform chordwise lengths;
    wherein, the joints in each row are nonuniformly spaced spanwise along the rotor blade;
    wherein, the joints in each row are asymmetrically disposed on the rotor blade;

wherein, the strain tolerant material is more pliant than the plurality of erosion shield segments;

wherein, the plurality of erosion shield segments further comprise a first and second erosion shield segments having a first joint of the joints therebetween, the strain tolerant material at the first joint formed from a material having an elasticity configured to permit narrowing of the first joint when the rotor blade assembly is nonrotating and widening of the first joint in response to centrifugal force when the rotor blade assembly is rotating; and wherein, the joints are configured to deform responsive to strain experienced by the rotor blade, thereby isolating the plurality of erosion shield segments from at least a portion of the strain experienced by the rotor blade.

2. The rotor blade assembly as recited in claim 1 wherein the joints are structural discontinuities within the erosion shield system.

3. The rotor blade assembly as recited in claim 1 wherein the joints have profiles selected from the group consisting of stepped profiles, angled profiles and S-profiles.

4. The rotor blade assembly as recited in claim 1 further comprising an adhesive layer disposed between at least one of the plurality of erosion shield segments and the rotor blade.

5. The rotor blade assembly as recited in claim 1 wherein the plurality of erosion shield segments are asymmetrically disposed on the leading edge of the rotor blade about a mid span chord.

6. The rotor blade assembly as recited in claim 1 wherein at least some of the joints are concentrated at a high strain region of the rotor blade.

7. The rotor blade assembly as recited in claim 1 wherein the first erosion shield segment is formed from a same material as the second erosion shield segment.

8. The rotor blade assembly as recited in claim 1 wherein the first erosion shield segment is formed from a different material than the second erosion shield segment.

9. The rotor blade assembly as recited in claim 1 wherein the erosion shield system further comprises at least one strain tolerant layer disposed between at least one of the plurality of erosion shield segments and the rotor blade, the at least one strain tolerant layer formed from the strain tolerant material.

10. The rotor blade assembly as recited in claim 1 wherein the plurality of erosion shield segments further comprise inboard and outboard edges forming the cavities; and wherein the strain tolerant material abuts the inboard and outboard edges of the plurality of erosion shield segments forming the cavities.

11. The rotor blade assembly as recited in claim 1 wherein the plurality of erosion shield segments further comprise inboard and outboard vertical edges forming the cavities; and wherein the strain tolerant material abuts the inboard and outboard vertical edges of the plurality of erosion shield segments forming the cavities.

12. The rotor blade assembly as recited in claim 1 wherein the first erosion shield segment has a different spanwise length than the second erosion shield segment.

13. The rotor blade assembly as recited in claim 1 wherein the first joint between the first and second erosion shield segments allows relative spanwise movement between the first and second erosion shield segments.

14. The rotor blade assembly as recited in claim 1 wherein at least one of the one or more rows of joints lacks a chordwise line of symmetry.

15. The rotor blade assembly as recited in claim 1 wherein the rotor blade includes low strain and high strain regions having boundaries based on a strain map of the rotor blade, the plurality of erosion shield segments shaped to contour the boundaries of the low strain and high strain regions of the rotor blade.

16. The rotor blade assembly as recited in claim 15 wherein the strain map is at least partially based on a length, a shape, a slope, a twist, a material and an anticipated speed of the rotor blade.

17. The rotor blade assembly as recited in claim 1 wherein the joints in each row have nonuniform widths.

18. The rotor blade assembly as recited in claim 1 wherein the erosion shield system further comprises a strain tolerant layer on the rotor blade and an intermediate layer interposed between the strain tolerant layer and the plurality of erosion shield segments, the plurality of erosion shield segments harder than the intermediate layer and the intermediate layer harder than the strain tolerant layer.

19. A rotorcraft comprising:

an engine;

a rotor hub assembly mechanically coupled to the engine; and a plurality of rotor blade assemblies rotatably mounted to the rotor hub assembly, each rotor blade assembly comprising:

a rotor blade having a root, a tip and a leading edge; and an erosion shield system extending spanwise along the leading edge of the rotor blade, the erosion shield system including a plurality of erosion shield segments positioned adjacent to one another forming cavities therebetween, the cavities contiguously filled with strain tolerant material to form one or more rows of joints such that the strain tolerant material is flush with an outer surface of the plurality of erosion shield segments;

wherein, the erosion shield system has a chordwise length that tapers in a spanwise direction from increasing to decreasing chordwise length from the root of the rotor blade to the tip of the rotor blade such that the plurality of erosion shield segments have nonuniform chordwise lengths;

wherein, the joints in each row are nonuniformly spaced spanwise along the rotor blade;

wherein, the joints in each row are asymmetrically disposed on the rotor blade;

wherein, the strain tolerant material is more pliant than the plurality of erosion shield segments;

wherein, the plurality of erosion shield segments further comprise a first and second erosion shield segments having a first joint of the joints therebetween, the strain tolerant material at the first joint formed from a material having an elasticity configured to permit narrowing of the first joint when the rotor blade assembly is nonrotating and widening of the first joint in response to centrifugal force when the rotor blade assembly is rotating; and wherein, the joints are configured to deform responsive to strain experienced by the rotor blade, thereby isolating the plurality of erosion shield segments from at least a portion of the strain experienced by the rotor blade.

20. The rotorcraft as recited in claim 19 wherein the erosion shield system further comprises at least one strain tolerant layer disposed between at least one of the plurality of erosion shield segments and the rotor blade, the at least one strain tolerant layer formed from the strain tolerant material.

* * * * *

UNITED STATES PATENT AND TRADEMARK OFFICE
CERTIFICATE OF CORRECTION

PATENT NO. : 10,538,317 B2
APPLICATION NO. : 15/221090
DATED : January 21, 2020
INVENTOR(S) : Nissen et al.

Page 1 of 1

It is certified that error appears in the above-identified patent and that said Letters Patent is hereby corrected as shown below:

In the Claims

Column 15, Line 4:
"comprise a first and second erosion shield segments" should read --comprise first and second erosion shield segments--

Column 16, Line 50:
"comprise a first and second erosion shield segments" should read --comprise first and second erosion shield segments--

Signed and Sealed this
Twenty-fifth Day of February, 2020

Andrei Iancu
*Director of the United States Patent and Trademark Office*